United States Patent [19]
Hornbuckle

[11] Patent Number: 6,012,018
[45] Date of Patent: *Jan. 4, 2000

[54] PRESENTATION AND INTERPRETATION OF SEISMIC DATA

[75] Inventor: William I. Hornbuckle, Katy, Tex.

[73] Assignee: Shell Oil Company, Houston, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/649,295

[22] Filed: May 17, 1996

[51] Int. Cl.⁷ .................................................. G06F 19/00
[52] U.S. Cl. .............................................. 702/16; 367/72
[58] Field of Search ........................... 395/929; 364/421, 364/422; 367/68, 72

[56] References Cited

U.S. PATENT DOCUMENTS

| | | | |
|---|---|---|---|
| 4,590,592 | 5/1986 | Bowman et al. | 367/68 |
| 4,991,095 | 2/1991 | Swanson | 364/421 |
| 5,170,377 | 12/1992 | Manzur et al. | 367/73 |
| 5,475,589 | 12/1995 | Armitage | 364/421 |
| 5,515,271 | 5/1996 | Al-Fares | 364/421 |

OTHER PUBLICATIONS

Abstract: Tung et al., "Development of an Interactive Reservoir Simulation and Visualization System for a Massively Parallel Processor," from Fifth ARCHIE Conference, May 14–18, 1995, The Woodlands Conference Center and Resort, the Woodlands, Texas.

*Primary Examiner*—Donald E. McElheny, Jr.
*Attorney, Agent, or Firm*—Arnold, White & Durkee

[57] ABSTRACT

The present invention relates to a method of presentation and interpretation of three-dimensional seismic data. In particular, the present invention relates to a method and apparatus for identifying volumetric subterranean regions bounded by a surface in which a specific seismic characteristic has a constant value. In one embodiment, three-dimensional seismic data for a subterranean volume is provided as input to a computer program for performing "isosurface" processing of the data. This results in a graphical representation of three-dimensional sub-volumes whose boundaries are defined by surfaces in which a specific seismic characteristic has a constant value.

41 Claims, 5 Drawing Sheets

(1 of 5 Drawing Sheet(s) Filed in Color)

PRESENTATION AND INTERPRETATION OF SEISMIC DATA

FIELD OF THE INVENTION

The present invention relates to the presentation and interpretation of geophysical data, and more particularly to an improved method and apparatus of searching for subterranean geophysical features.

BACKGROUND OF THE INVENTION

The use of seismic techniques to obtain information about subterranean geophysical features is very well-known in the prior art. Such techniques are commonly employed in the exploration for and production of hydrocarbons, e.g, natural gas and oil. The advantages and desirability of accurate characterization of subterranean features are self-evident.

Raw seismic data is typically obtained through the use of a seismic source and receiver. This acquisition may take place on land or in a marine setting. As is known by those of ordinary skill in the art, so-called "processed" seismic data is derived from the raw seismic data by applying such conventional processing techniques as static correction, amplitude recovery, band-limiting or frequency filtering, stacking, and migration. The processed seismic data may be of either the so-called reflection coefficient data type or the integrated trace data type.

Once the processed seismic data has been derived, this data must-be correlated with such physical characteristics as reservoir continuity, reservior thickness, pore fill fluid type (oil, gas, water, etc . . . ), lithologic variation, and pay thickness, to name but a few. This correlation is most commonly accomplished using seismic data (two or three dimensional) in conjunction with electric well logs. Other ways of making this correlation include, e.g., analysis of surface out-crops and statistical modelling exercises.

Three-dimensional seismic data are a 3-D grid of data which are commonly regularly sampled on x-y-z coordinate axes. The subsurface seismic response data may be obtained in any desired conventional manner, e.g., by conducting a seismic survey or by acquiring data generated in a previous seismic survey (e.g., by purchasing the data from a seismic vendor). Three-dimensional data can also be obtained by "regularizing" an irregularly-sampled data set, e.g., a two-dimensional seismic survey.

SUMMARY OF THE INVENTION

The present invention relates to an improved method of presentation and interpretation of three-dimensional seismic data. In particular, the present invention relates to a method and apparatus for identifying volumetric subterranean regions bounded by a surface in which a specific seismic characteristic has a constant value.

In one embodiment, three-dimensional seismic data for a subterranean volume is provided as input to a computer program for performing "isosurface" processing of the data. This results in a graphical representation of three-dimensional sub-volumes whose boundaries are defined by surfaces in which a specific seismic characteristic has a constant value.

BRIEF DESCRIPTION OF THE DRAWINGS

The file of this patent contains at least one drawing executed in color. Copies of this patent with color drawing (s) will be provided by the Patent and Trademark Office upon request and payment of the necessary fee.

DETAILED DESCRIPTION OF A SPECIFIC EMBODIMENT OF THE INVENTION

An illustrative embodiment of the invention is described below. In the interest of clarity, not all features of an actual implementation are described in this specification. It will of course be appreciated that in the development of any such actual implementation (as in any computer-system development project), numerous engineering and programming decisions must be made to achieve the developers' specific goals and subgoals (e.g., compliance with system- and business-related constraints), which will vary from one implementation to another. Moreover, attention will necessarily be paid to proper programming practices for the environment in question. It will be appreciated that such a development effort might be complex and time-consuming, but would nevertheless be a routine undertaking of system development for those of ordinary skill having the benefit of this disclosure.

Figure 1:
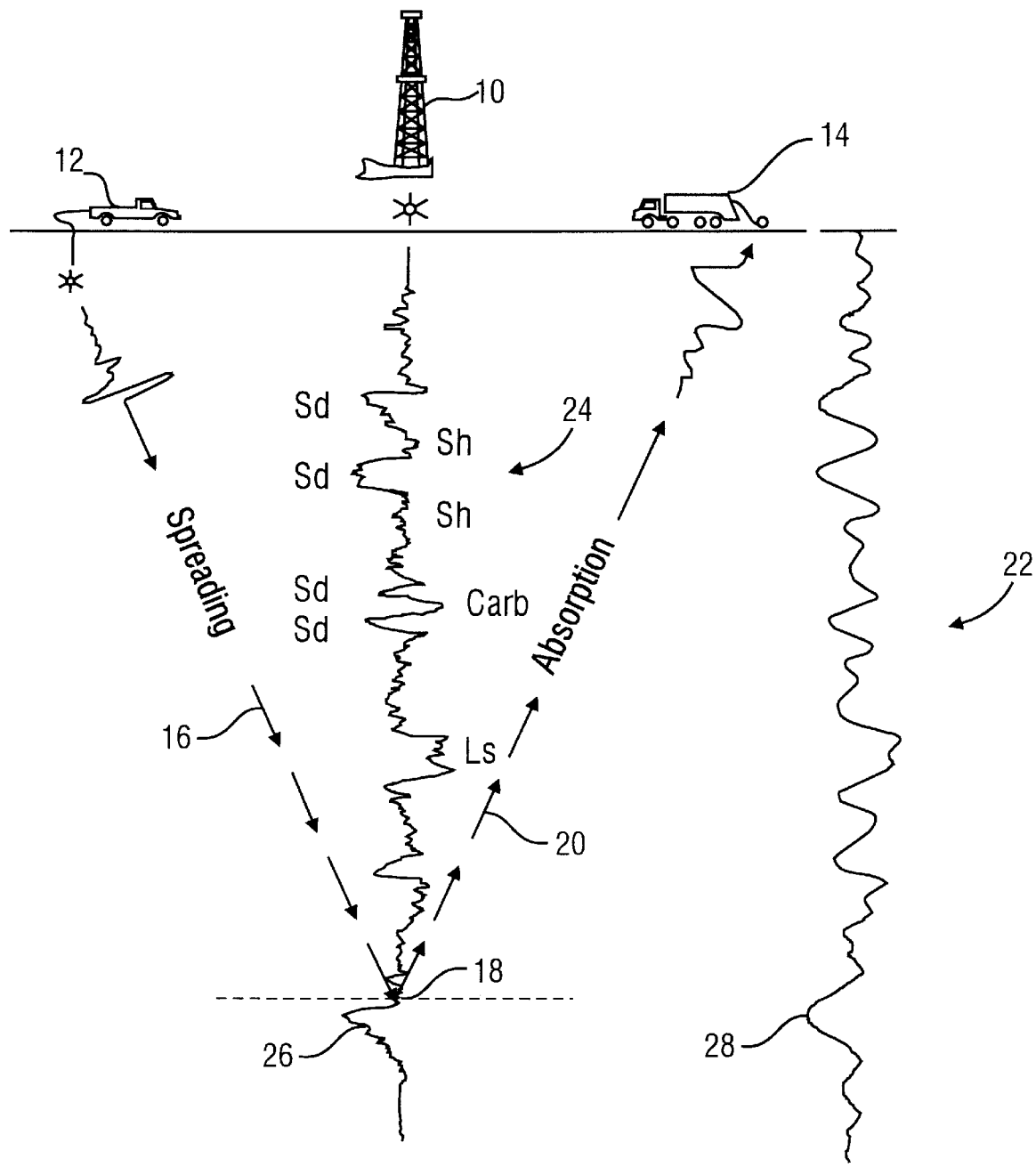
FIG. 1 is a vertical cross-sectional view of of a seismic line in the vicinity of a well site.

FIG. 1 is a vertical cross-sectional view illustrating a conventional seismic survey being conducted in the vicinity of the site of a well 10. The seismic acquisition equipment depicted in FIG. 1 includes a seismic (sound) source 12, and a seismic receiver (geophone) 14.

Reference numeral 16 in FIG. 1 identifies the ray path or travel path of a seismic pulse as it travels from source 12 to a subterranean objective 18. Reference number 20 identifies the ray path of the pulse after it is reflected off of objective 18 and travels to receiver 14. Reference numeral 22 in FIG. 1 identifies a resulting integrated seismic trace obtained as a result of the seismic shot so conducted. As would be appreciated by those of ordinary skill in the art, seismic trace 22 is an amplitude versus time representation of acoustic reflections from strata in the earth showing seismic correlation to lithology.

Reference numeral 24 in FIG. 1 identifies an electric well log such as is obtained by wireline logging companies and would be familiar to those of ordinary skill in the art. Correlation of the seismic trace 22 with well log 24 shows that the seismic pulse has been reflected off objective rock layer 18 and recorded at the surface by the seismic receiver 14. Those of ordinary skill in the art will recognize that the excursion 26 in the electric well log and the corresponding excursion 28 in the seismic trace are representative of and correlate with the objective rock layer 18.

Obtaining three-dimensional seismic data commonly involves arranging multiple seismic energy sources and receivers to form a grid or array. Each of the sources is activated to create a seismic pulse that penetrates into the layered strata of the earth. The wave contacts a subsurface acoustic impedance boundary or layer and is reflected back to the surface, as described above with reference to FIG. 1.

Figure 2:
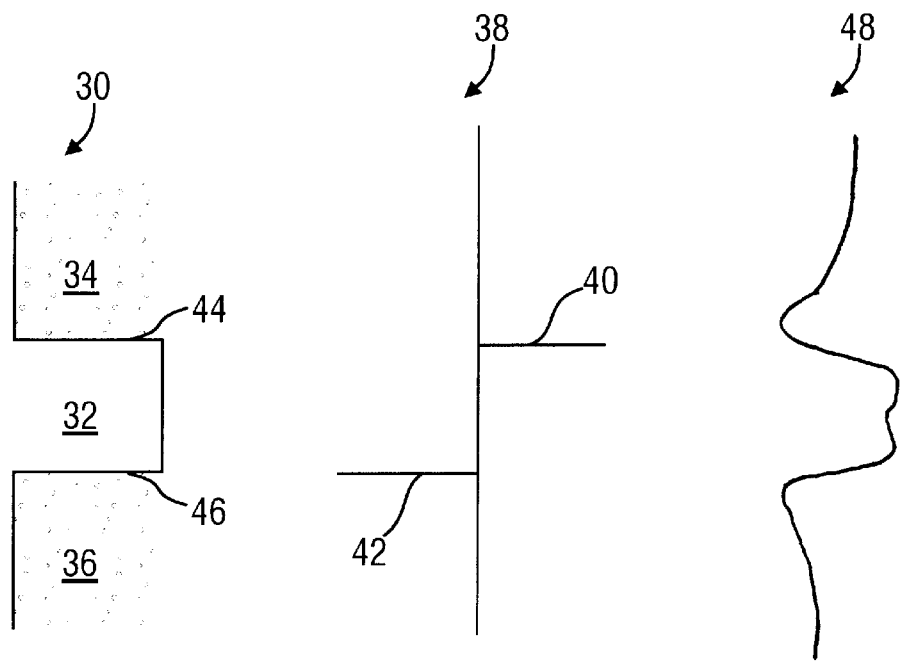
FIG. 2 shows a simplified rock layer model of a sand encased in top and bottom shale, a reflection coefficient data trace corresponding to the rock layer model, and an integrated, band-limited seismic trace corresponding to the rock layer model

FIG. 2 shows a simplified rock layer model 30 of sand 32 encased in top and bottom shale 34 and 36, respectively. FIG. 2 also shows the reflection seismic response 38 to the simplified model. The top reflection 40 and bottom reflection 42 have opposite polarity. Those of ordinary skill in the art will recognize that this is because a hard-to-soft interface 44 will have opposite polarity from a soft-to-hard interface 46.

Finally, FIG. 2 shows an integrated, band-limited seismic trace 48 corresponding to the simplified rock layer model 30 and seismic response 38. Notice the correlation between the loop and the rock layer itself as compared with the reflection coefficient correlation with the rock layer interfaces. This makes the integrated trace data much easier to interpret accurately.

In accordance with one embodiment of the invention, so-called isosurface techniques are applied to seismic trace data to generate a graphic image comprising a series of closed polygonal bodies representing contiguous subvolumes or regions, for example, sand reservoirs, in the subsurface volume. That is, subsurface regions of subsurface regions bounded by a constant-seismic-attribute value, are depicted in a three-dimensional representation. In a preferred embodiment, isosurface techniques are applied to integrated seismic data, although it is contemplated that reflection coefficient data as well as synthetic and well log data may also be used.

In a geological region where physical characteristics (e.g., the presence of oil or gas) are well-correlated with seismic attributes, (e.g., seismic amplitude data), the identification of a subvolume bounded by a constant-seismic-attribute-value surface may provide a very useful predictor of the volumetric extent of the attribute and hence of the characteristic. For example, the extent of a reservoir compartment of gas-bearing sand can be effectively determined using techniques in accordance with the present invention.

As noted above, the identification of constant-seismic-attribute-value surfaces can be conventionally made using any one of a number of known industry-standard algorithms, sometimes known as "isosurface" algorithms, such as the well-known General Electric "marching cubes" algorithm (see, e.g., Montani, et al., "Using Marching Cubes on Small Machines" CVGIP: Graphical Models and Image Processing, v. 56, n. 2, p. 182, March, 1994).

Figure 3:
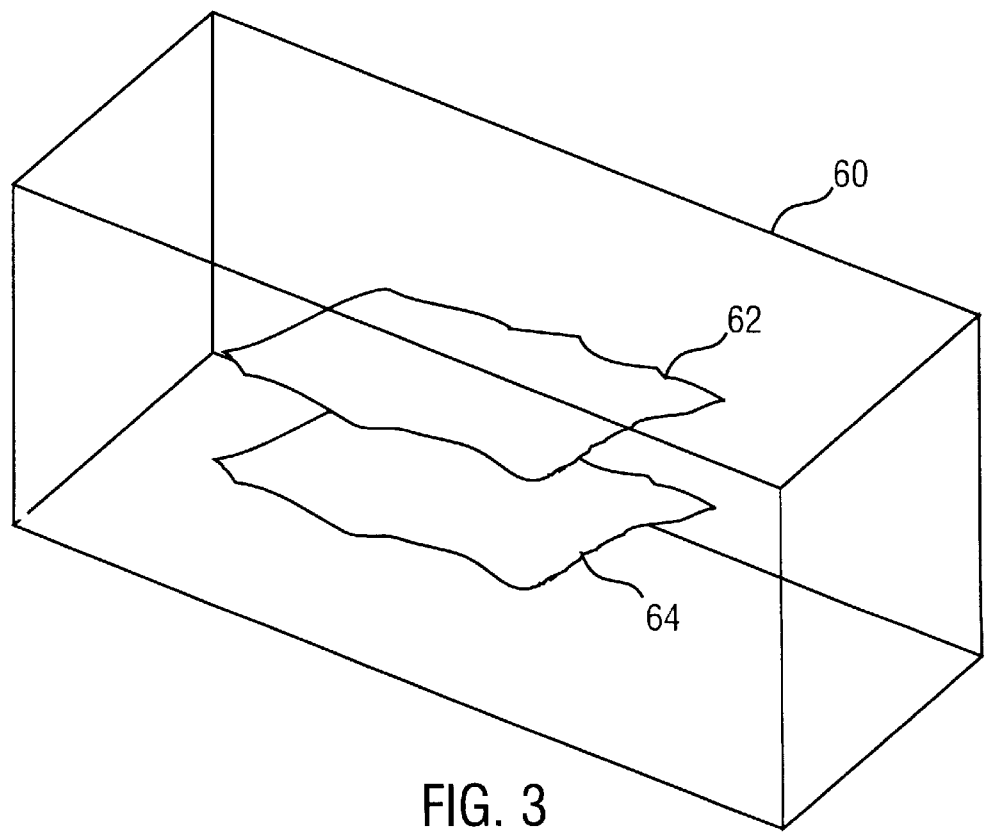
FIG. 3 shows a graphical representation of the result of isosurface processing of three-dimensional reflection coefficient seismic data in accordance with one embodiment of the invention.

If the processed seismic data to which the isosurface algorithm is applied is of the so-called reflection coefficient type, the resultant isosurfaces will correspond to interfaces between rock layers; this is shown in FIG. 3. In particular, FIG. 3 shows the result of applying isosurface techniques to reflection coefficient seismic data, in accordance with one embodiment of the invention, from a subsurface volume 60. Isosurface techniques applied to the reflection coefficient data yield a graphical representation showing, in the example of FIG. 3, two interfaces 62 and 64 between subterranean regions. As noted above, interfaces 62 and 64 reflect sufaces in which a specific seismic value (reservoir continuity, reservoir thickness, fill fluid type, etc . . . ) has a constant value.

Figure 4:
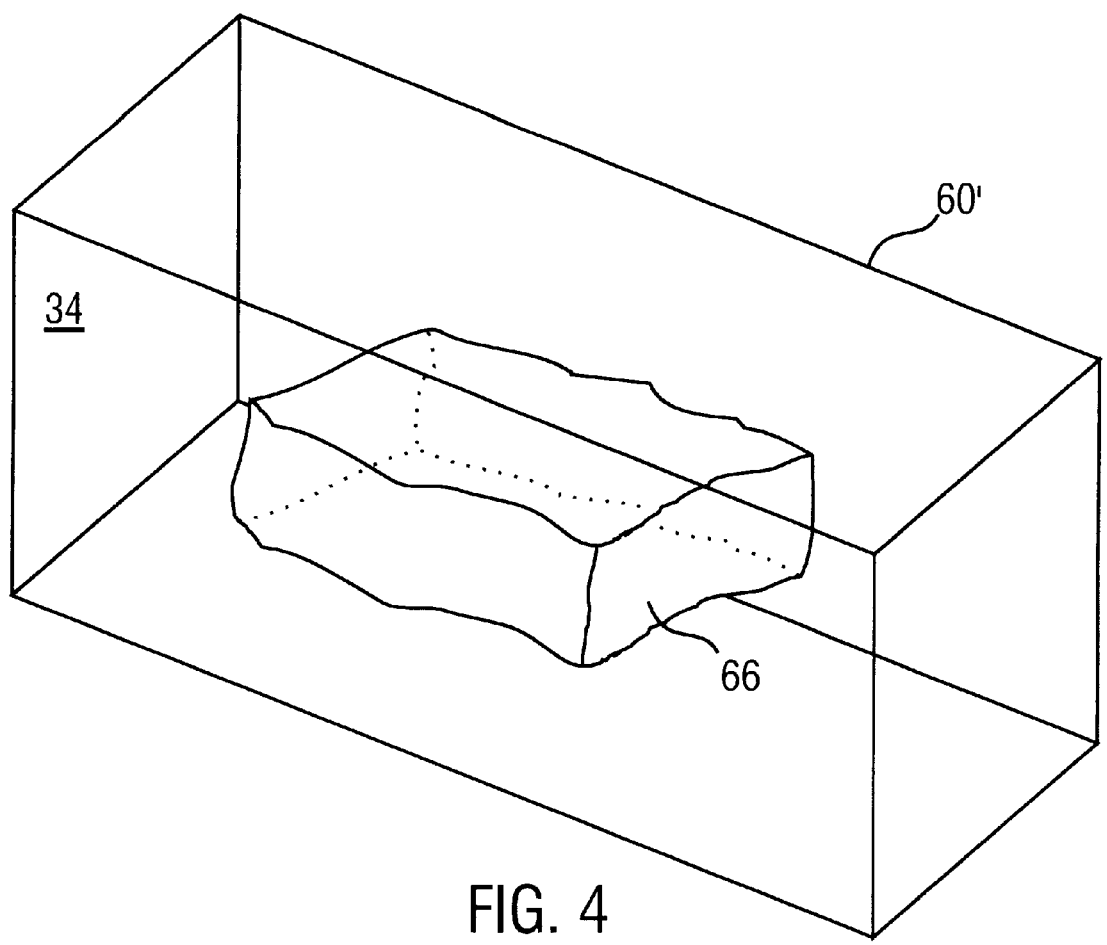
FIG. 4 shows a graphical representation of the result of isosurface processing of three-dimensional integrated seismic data in accordance with one embodiment of the invention.

On the other hand, if so-called integrated trace processed seismic data is used, the resultant isosurfaces obtained in accordance with the presently disclosed embodiment of the invention will correspond to the rock layers themselves; this is shown in FIG. 4. In particular, FIG. 4 shows that isosurface techniques are applied to integrated seismic data from a seismic volume 60' yields a graphical representation of a three-dimensional subterranean region bounded by a surface (isosurface) in which a specified seismic attribute has a constant value.

Whether reflection coefficient data or integrated data is used, the seismic attribute information to which the isosurface algorithm is applied may be amplitude data or wavelet shape data (e.g., thickness, kurtosis, area under the curve, skewness), any of which can be conventionally derived from processed seismic data using standard industry techniques.

Figure 5:
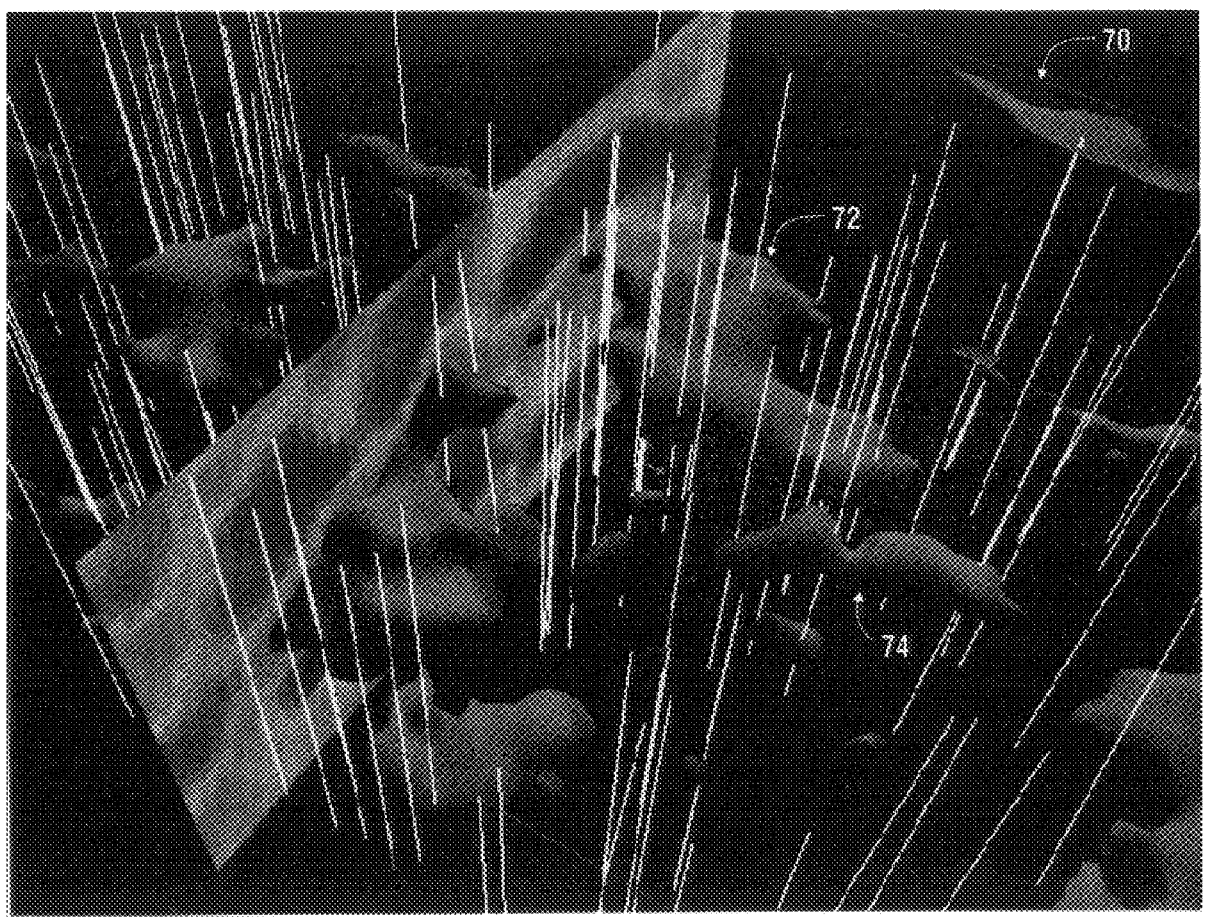
FIG. 5 shows another graphical representation of the result of isosurface processing of three-dimensional integrated seismic data in accordance with one embodiment of the invention.

FIG. 5 shows the graphical output from a system in accordance with one embodiment of the invention applied to actual seismic data. As shown in FIG. 5, isosuface techniques have been applied to integrated seismic data from a subterranean volume 70. The resultant image shows a plurality of subterranean regions 72, 74, etc . . . , bounded by surfaces on which a specific seismic attribute has a constant value.

Figure 6:
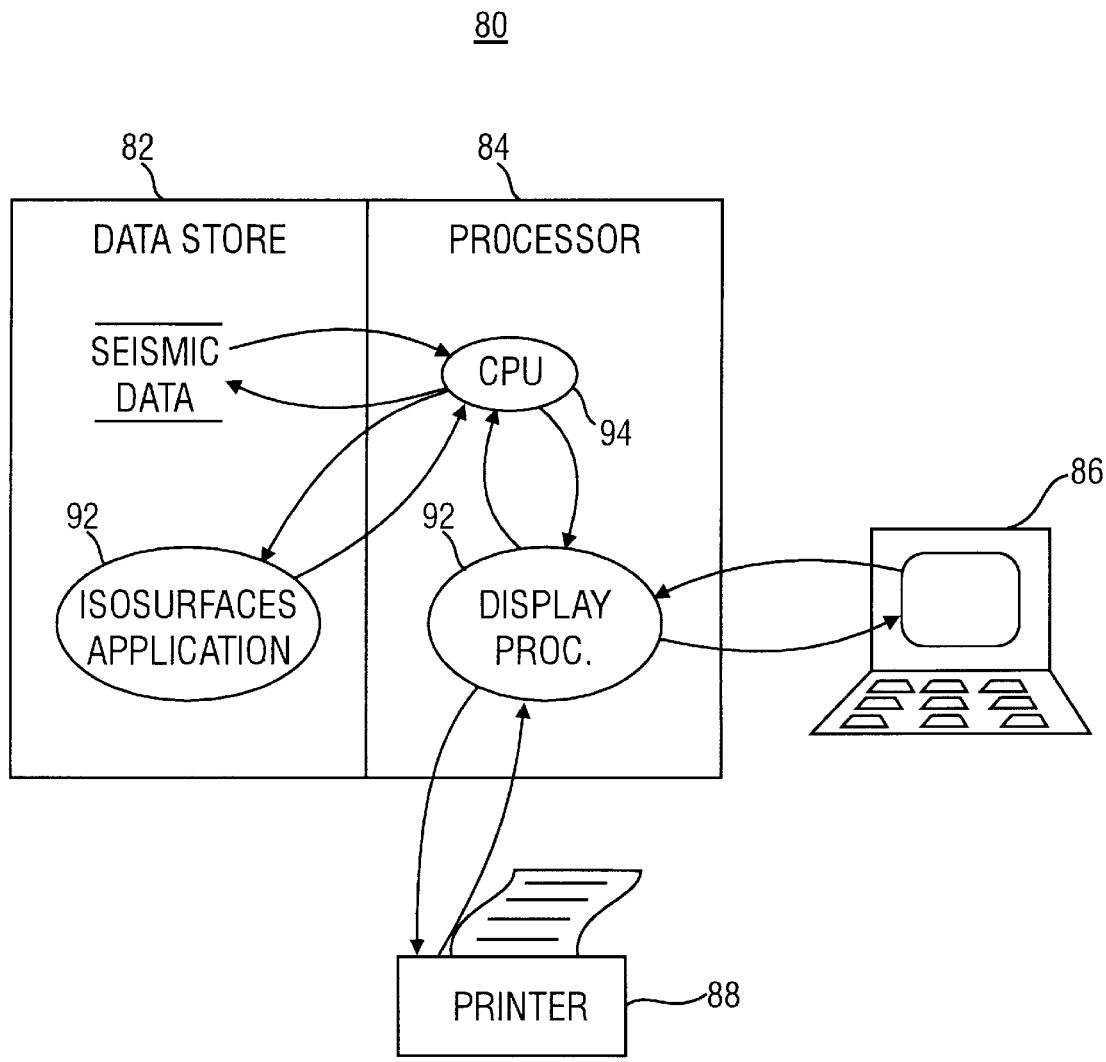
FIG. 6 is a simplified block diagram of a computer processing system in accordance with one embodiment of the invention.

Turning now to FIG. 6, there is shown a greatly simplified block diagram representation of a computer system 80 in accordance with one embodiment of the invention. Computer system 80 comprises a data store 82 coupled to a processor 84, and further preferably includes a user terminal 86 and a graphical output device 88, e.g., a printer, plotter, or the like.

Data store 82 commonly takes the form of one or more memory devices (e.g., random-access memory) in combination with, e.g., one or more mass storage devices, such as hard-disks, optical disks, magnetic tapes, and flash memory devices, among others. In the presently disclosed embodiment of the invention, data store 82 is used to store seismic data 90, as well as an isosurfaces application, such as one of the ones mentioned above.

On the processor side 84, computer system 80 comprises a central processing unit or CPU 94 and display processing hardware 96 coupled to user terminal 86 and to graphical output device 88.

In operation of computer system 80 in accordance with the principles of the present invention, CPU 94 functions under control of the programming of isosurfaces application 92 to process seismic data 90. The resultant output of this processing may then be displayed on a graphical display terminal 86 or graphical output unit 88.

It will be apparent to those of ordinary skill having the benefit of this disclosure that any of the foregoing variations may be implemented by programming a suitable general-purpose computer having appropriate hardware. The programming may be accomplished through the use of a program storage device readable by the computer and encoding a program of instructions executable by the computer for performing the operations described above. The program storage device may take the form of, e.g., one or more floppy disks; a CD ROM or other optical disk; a magnetic tape; a read-only memory chip (ROM); and other forms of the kind well-known in the art or subsequently developed. The program of instructions may be "object code," i.e., in binary form that is executable more-or-less directly by the computer; in "source code" that requires compilation or interpretation before execution; or in some intermediate form such as partially compiled code. The precise forms of the program storage device and of the encoding of instructions is immaterial here.

It will be appreciated by those of ordinary skill having the benefit of this disclosure that the illustrative embodiments described above are capable of numerous variations without departing from the scope and spirit of the invention. Accordingly, the exclusive rights sought to be patented are as described in the claims below.

What is claimed is:

1. A method of searching, in a subsurface region, for at least one subvolume that is likely to possess a specified physical characteristic, comprising:

(a) obtaining processed seismic data that includes three-dimensional subsurface seismic response information for the region;

(b) deriving, from the processed seismic data, respective values of a specified seismic attribute of the data for a plurality of points in the subsurface region, the seismic attribute being correlated to the specified physical characteristic;

(c) identifying at least one subvolume of the region that is bounded by a surface on which the seismic attribute has a constant value.

2. A method in accordance with claim 1, wherein said specified physical characteristic is reservoir continuity.

3. A method in accordance with claim 1, wherein said specified physical characteristic is reservoir thickness.

4. A method in accordance with claim 1, wherein said specified physical characteristic is pore fill fluid type.

5. A method in accordance with claim 1, wherein said specified physical characteristic is lithologic variation.

6. A method in accordance with claim 1, wherein said processed seismic data is integrated trace data.

7. A method in accordance with claim 1, wherein said processed seismic data is reflection coefficient data.

8. A method in accordance with claim 1, wherein said specified seismic attribute is amplitude.

9. A method in accordance with claim 1, wherein said specified seismic attribute is wavelet shape.

10. A method in accordance with claim 9, further comprising the operation (d) of repeating operations (a) through (c) using a different specified seismic attribute of the data.

11. The method of claim 1, further comprising generating a perspective view of the region that depicts the spatial location of the at least one subvolume.

12. The method of claim 11 wherein the elevational view is a structure map.

13. The method of claim 1, further comprising drilling a well into the identified subvolume.

14. A method of processing seismic data including three-dimensional seismic response information for a subsurface region having at least one subvolume likely to possess a specified physical characteristic, comprising:

(a) deriving, from the seismic data, respective values of a specified seismic attribute of the data for a plurality of points in the subsurface region, the seismic attribute being correlated to the specified physical characteristic;

(b) identifying at least one subvolume of the region that is bounded by a surface on which the seismic attribute has a constant value.

15. A method in accordance with claim 14, wherein said specified physical characteristic is reservoir continuity.

16. A method in accordance with claim 14, wherein said specified physical characteristic is reservoir thickness.

17. A method in accordance with claim 14, wherein said specified physical characteristic is pore fill fluid type.

18. A method in accordance with claim 14, wherein said specified physical characteristic is lithologic variation.

19. A method in accordance with claim 14, wherein said processed seismic data is integrated trace data.

20. A method in accordance with claim 14, wherein said processed seismic data is reflection coefficient data.

21. A method in accordance with claim 14, wherein said specified seismic attribute is amplitude.

22. A method in accordance with claim 14, wherein said specified seismic attribute is wavelet shape.

23. A method in accordance with claim 22, further comprising the operation (c) of repeating operations (a) through (b) using a different specified seismic attribute of the data.

24. The method of claim 14, further comprising generating an elevational view of the region that depicts the spatial location of the at least one subvolume.

25. The method of claim 24 wherein the elevational view is a structure map.

26. The method of claim 14, further comprising drilling a well into the identified subvolume.

27. An apparatus for processing seismic data comprising respective values of a specified seismic attribute for a plurality of points in a subsurface region, the seismic attribute being correlated to the specified physical characteristic, said apparatus comprising a data storage device for storing said seismic data; and a processor, coupled to said data storage device, for processing said seismic data in accordance with an isosurface application to identify at least one subvolume of the region that is bounded by a surface on which the seismic attribute has a constant value.

28. An apparatus in accordance with claim 27, wherein said specified physical characteristic is reservoir continuity.

29. An apparatus in accordance with claim 27, wherein said specified physical characteristic is reservoir thickness.

30. An apparatus in accordance with claim 27, wherein said specified physical characteristic is pore fill fluid type.

31. An apparatus in accordance with claim 27, wherein said specified physical characteristic is lithologic variation.

32. An apparatus in accordance with claim 27, wherein said processed seismic data is integrated trace data.

33. An apparatus in accordance with claim 27, wherein said processed seismic data is reflection coefficient data.

34. An apparatus in accordance with claim 27, wherein said specified seismic attribute is amplitude.

35. An apparatus in accordance with claim 27, wherein said specified seismic attribute is wavelet shape.

36. An apparatus in accordance with claim 35, further comprising the step (d) of repeating steps (a) through (c) using a different specified seismic attribute of the data.

37. An apparatus in accordance with claim 27, further comprising generating an elevational view of the region that depicts the spatial location of the at least one subvolume.

38. An apparatus in accordance with claim 37 wherein the elevational view is a structure map.

39. An apparatus in accordance with claim 27, further comprising drilling a well into the identified subvolume.

40. A programmed storage device readable by a computer system, encoding a program of instructions executable by the computer system for performing operations recited in a specified one of claims 1–12 and 14–25.

41. A computer system that includes (1) a data store containing seismic data; (2) a programmable processor; and (3) a program storage device readable by the processor and encoding a program of instructions for performing operations including the operations recited in a specified one of claims 1–12 and 14–25.

* * * * *